Patented Dec. 14, 1948

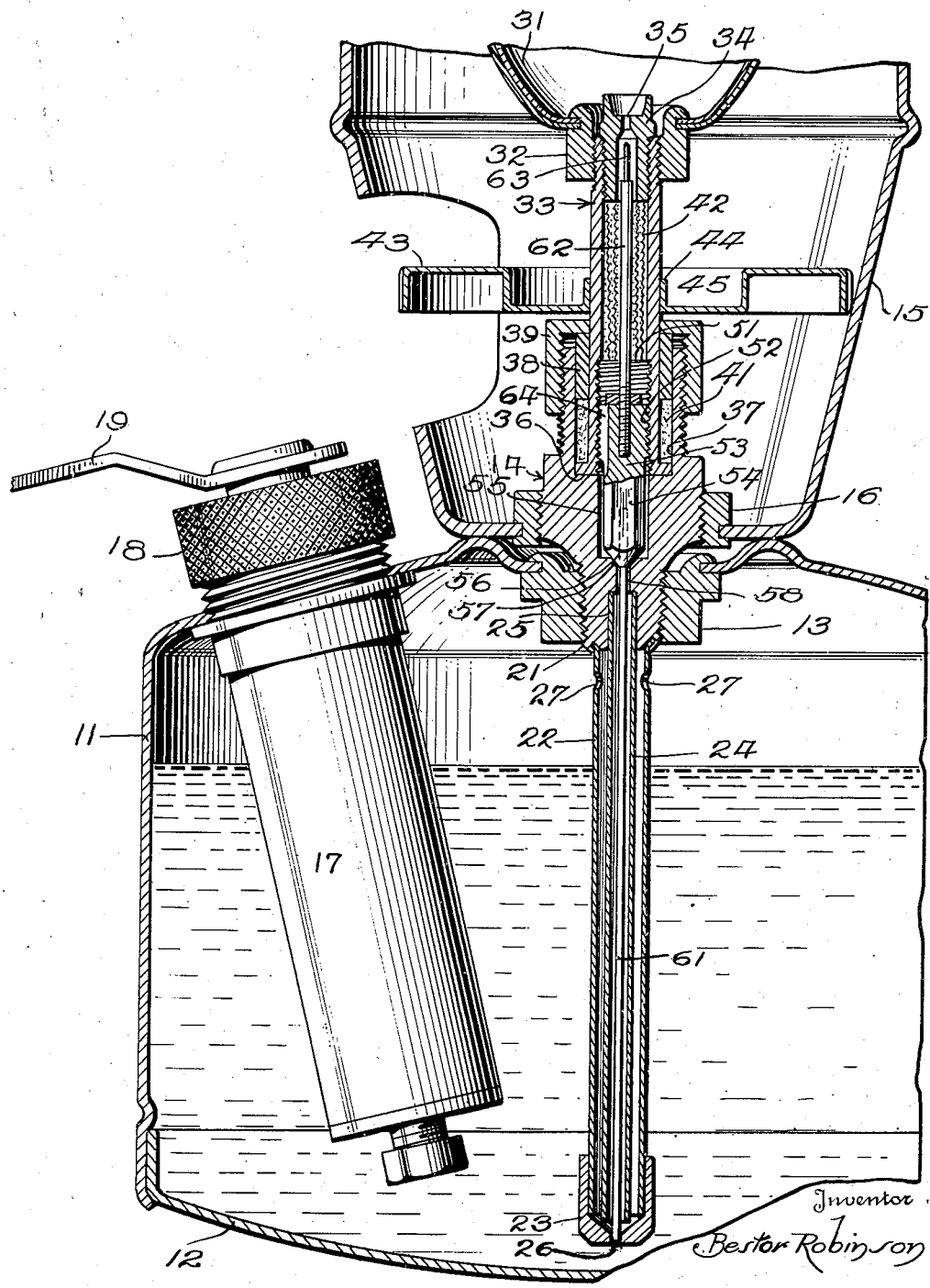

2,455,950

UNITED STATES PATENT OFFICE 2,455,950

PORTABLE STOVE FOR BURNING LIQUID FUEL AND BURNER CONTROL MECHANISM THEREFOR

Bestor Robinson, United States Army, Oakland, Calif.

Application July 7, 1942, Serial No. 449,987

17 Claims. (Cl. 158—32)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to a liquid fuel burner, and more specifically to a novel and improved burner particularly adapted for use in miniature gasoline stoves or similar equipment.

One of the principal objects of the present invention resides in the provision of a miniature gasoline stove of compact and rugged design, and unusual simplicity, and capable of economical methods of manufacture.

A further object of the invention is a provision of a novel and improved burner control mechanism for a liquid fuel burner.

A further object of the invention is a provision of a novel manual control device for a liquid fuel burner, said control device being arranged to simultaneously and concurrently operate three separate burner control mechanisms; namely, the fuel shut-off valve, the fuel mixing valve, and the burner tip cleaning needle.

It is a further object of the invention to provide a single control device so constructed and arranged as to operate each of the above-mentioned control mechanisms in a pre-determined sequence in order to simplify the operation of the burner mechanism.

A further object of the invention resides in the provision of a rotating burner tube including an adjusting wheel positioned on said burner so that all of the essential adjustments incident to the functioning of the burner may be controlled by the rotation of the single control wheel.

A further object of the invention resides in the provision of a fuel burner wherein every mechanical part is of generally circular shape, and located in co-axial position; in order that the individual parts will be adapted to manufacture by economical methods (as by screw machine production as contrasted with casting or forging) and so that the burner assembly will be characterized by the absence of T fittings, projecting knobs or levers, or other external structural irregularities subject to damage from external impacts.

A further object is the provision of a fuel burner including a mixing valve, shut-off valve, and cleaning needle in straight line co-axial relationship with each other, positively operated and arranged to be sealed in assembled position by a single packing clamping nut; the arrangement being such that the removal of said single nut permits disassembly of the burner and unobstructed straight-line access to the entire length of the fuel channel, thus facilitating cleaning, repair or replacement of parts, or removal of foreign substances from the fuel channel.

A further object of the invention resides in the provision of a circular adjusting wheel concentrically positioned with respect to the burner tip and provided with a central recess around and below the burner; said recess being arranged to function as a priming sump or auxiliary reservoir to facilitate the ignition of the burner.

Another prime object of the invention is to provide a fuel burner having a mixing valve, a shut-off valve, and a cleaning needle mounted in a fixed relationship to each other and arranged to be simultaneously shifted to control the adjustment of the burner.

Other objects will appear hereinafter.

Referring now more particularly to the drawings attached to and forming a part of the present specification, the single figure is an enlarged detail sectional view through a miniature gasoline stove having a fuel burner constructed in accordance with the teachings of the present invention.

The stove comprises, in general, a main fuel reservoir 11 having a bottom portion 12 and provided with a reinforced mounting 13 to support the main fitting 14, on which a burner housing 15 is secured by the threaded flange 16. An air pump 17 is mounted on the filler cap 18, and the arrangement is such that the main reservoir 11 may be filled with fuel by unscrewing the pump and removing it from its mounting. The pressure within the reservoir 11 may be increased by operating the handle 19 of the fuel pump 17.

The main burner base or fitting 14 is firmly united with the flange 13 of the main fuel reservoir 11 by the screw threads 21 and the fitting 14 is provided with a downwardly extending air tube 22 having its lower end adjacent the bottom of the fuel reservoir and arranged to support a fuel mixing cap 23. A fuel tube 24 of somewhat smaller diameter than the air tube 22 is mounted in the counterbored portion 25 of the fitting 14 and is arranged to extend downwardly inside of the air tube to a point just below the lower extremity of the air tube and just above the mixing orifice 26 of the fuel mixing cap 23. The upper end of the air tube 22 is provided with a plurality of air inlet portions 27, so that air may be admitted to the tube 22 at a point above the normal maximum fuel level of the reservoir.

As thus far described, the mechanism is more or less conventional, and since it does not in itself constitute the essential features of the present invention, it will not be described in greater detail in the present application.

The burner assembly

A stove burner 31 is rigidly secured to the flange 32, and flange 32 is in turn threaded on the upper end of a rotatable burner tube 33. The upper end of the burner tube 33 is provided with a threaded burner jet 34 having a restricted fuel orifice 35. The lower end of the burner tube 33 is provided with an annular shoulder 36 and is rotatably mounted in the counterbored portion 37 of the main burner fitting 14.

It will be noted that the tube 33 is free to rotate within the counterbore 37, but the structure is sealed against leakage of fuel by the gland 38, arranged to be forced downwardly by the nut 39 to compress the packing 41 around the lower end of the tube 33 and thus prevent leakage of fuel. A rolled wire screen 42 is positioned within the tube 33 for purposes well understood in the art. An adjusting wheel 43 provided with an auxiliary reservoir or sump 45 is permanently connected to the tube 33 as by soldering the flange 44 into engagement with the tube, and the wheel 43 is preferably formed to include a central cavity which acts as an auxiliary reservoir or priming sump 45.

Control assembly

The lower extremity of the burner tube 33 is provided with internal threads 51, adapted to receive the upper threaded portion 52 of the control plunger or valve stem 53. The lower portion of the control plunger 53 is splined into the cavity 55, or is of hexagonal formation to provide, in effect, a splined slide 54 fitted within a hexagonal cavity 55 in the main burner fitting 14. The arrangement is such that the hexagonal slide 54 fits sufficiently closely within the hexagonal cavity 55 so that it cannot rotate, but sufficient clearance is provided to permit the passage of liquid fuel upwardly between the slide and the walls of the cavity.

The lower extremity of the control plunger is formed in a conical shape to provide a valve portion 56, arranged to seal a valve seat 57 at the upper end of the fuel port 58 leading from the fuel tube 24 to the cavity 55 of the main burner fitting 14. The lower end of the control plunger 53 is drilled to receive and support a fuel control rod 61 that extends downwardly to the mixing orifice 26 of the fuel mixing cap 23.

The upper end of the fuel control plunger 53 is also drilled to receive and support a needle rod 62, arranged to extend upwardly through the tube 33 and to support a cleaning needle 63 normally positioned immediately below the fuel orifice 35 of the burner tip 34. One side of the upper threaded portion 52 of the control plunger 53 is grooved at 64 to provide a passageway so that liquid fuel may flow upwardly from the cavity 55 to the interior of the tube 33 and thence to the burner tip, as will be hereinafter described.

Operation

To operate the fuel burner, the parts will be positioned first in the relative positions shown in the drawing, and the air pressure above the liquid level raised to the desired pressure by manually pumping air into the reservoir by the manipulation of the handle 19 of the air pump 17. The operator will then rotate the control wheel 43, which will in turn rotate the burner tube 33 and, since the control plunger 53 is maintained in non-rotating position by the engagement of its hexagonal portion with the cavity 55, the screw threads 51 will lift the plunger 53 to disengage the conical valve portion 56 from the valve seat 57 and permit fluid to flow upwardly through the tube 24, port 58, cavity 55, groove 64, tube 33 and jet orifice 35.

As this action occurs, however, it will be noted that the lower extremity of the fuel control rod 61 is still positioned within the mixing orifice 26 and these parts act as a mixing valve, so that the flow of gasoline or other fuel into the lower end of the tube is restricted. The rod 61 is slightly smaller in diameter than the orifice, however, so that a metered amount of fuel is admitted. Under these circumstances, air from the upper part of the fuel reservoir will flow inwardly through the air inlet ports 27, thence downwardly through the air tube and upwardly through the fuel tube, with the result that the fuel entering the port 26 will be mixed with air to provide a partially carbureted mixture that may be quite easily ignited when ejected from the fuel orifice 35 of the burner.

As soon as the burner is ignited and the upper portions of the burner jet and burner tube reach operating temperatures, the operator may rotate the control wheel 43 further in the same direction as before, to lift the lower end of the fuel control rod clear of the mixing orifice 26, so that liquid fuel may flow unrestrictedly into the orifice 26 and pure liquid fuel will be fed up the fuel tube 24 and to the burner. This is a normal operating position of the burner and may be maintained until it is desired to turn the burner off or until the products of combustion resulting from long continued operation of the burner tend to clog the fuel orifice 35. When the fuel orifice 35 of the jet 34 becomes obstructed, however, it may be cleared by the simple expedient of continuing the rotation of the control wheel 43 in the same direction as before to further raise the control plunger 53 until the cleaning needle 63 enters the fuel orifice 35 and dislodges foreign matter from the orifice. Further movement of the control wheel 43 will bring the upper end of the plunger 53 to the end of the internal threads 51 of the burner tube, and these threads will thus serve as a stop to limit the upward travel of the control plunger 53 and thus prevent damage to the cleaning needle 63 or burner tip 34.

Reverse motion of the control wheel 43 will, of course, withdraw the cleaning needle from the orifice 35 to return the burner adjustments to operating position. Further rotation of the wheel will cause the valve 56 to engage the seat 57 and shut off the burner.

Under certain conditions, it is desirable to prime the burner by heating the burner cup tip and associated parts to a temperature approaching operating temperature before attempting to ignite the fuel mixture. This may be accomplished in the device illustrated by pouring a small quantity of liquid fuel into the auxiliary reservoir or sump 45 and igniting the fuel, so that it will heat the burner to predetermined temperature before the valve 56—57 is opened.

From the foregoing it will be apparent that by practicing the teachings of the present invention it is possible to provide a novel and improved fuel burner control of unusual simplicity and of extremely compact and rugged mechanical design, well adapted to the use under adverse conditions where equipment of this character is subject to hard use or to rough handling and abuse. It will be further appreciated that the arrangement disclosed in the present application provides a means whereby the several necessary controls of a hydrocarbon fuel burner are automatically operated in proper predetermined sequence, so that persons entirely unfamiliar with the proper mode of operation of the usual controls on a burner of this general class can operate the device disclosed in this application without failure, without loss of fuel, or without loss of air pressure. It will also be noted that the structure disclosed is of unusually rugged mechanical design, since all of the adjustments are accomplished by a single knurled wheel positioned entirely within the dimensional limits of the burner housing, but available for easy and quick manual manipulation.

The present invention has been developed in the United States Army with a view toward the provision of a burner having military characteristics required in equipment designed for use by ski troops, parachute troops and others operating in cold climate regions, where the equipment is subject to hard use and a considerable degree of abuse. It is believed, however, that the utility of the device is not limited to military uses but extends into civilian and commercial fields as well, and it is accordingly requested that the scope of the invention be regarded as limited only by the terms of the appended claims.

Having thus described my invention, what I claim as new and desire to secure by Letters Patent is:

1. In a hydrocarbon fuel burner, in combination, a fuel reservoir and a burner assembly, said burner assembly including a body portion, a burner tip extending above said body portion, said burner tip being provided with a fuel orifice, an air tube extending downwardly from said body portion and communicating with the fuel reservoir, a fuel tube extending downwardly from said body portion and communicating with the fuel reservoir, a fuel mixing valve associated with said air and fuel tubes; a fuel shut-off valve positioned above said fuel mixing valve, and a cleaning needle structure positioned above said shut-off valve and adapted to engage the fuel orifice of the burner tip, said mixing valve, shut-off valve and cleaning needle structure being positioned in vertical alignment and adapted to move longitudinally of said body portion and being mechanically interconnected with each other and adapted to move simultaneously with each other and to concurrently and successively open the shut-off valve, open the mixing valve and raise the cleaning needle into operating engagement with the fuel orifice of the burner tip.

2. In a hydrocarbon fuel burner, in combination, a body portion adapted to be engaged with the fuel reservoir of the burner; said body portion including a counterbore at its upper end and a cavity below said counterbore and a valve seat below said cavity; a burner control plunger comprising a portion arranged for sliding movement with respect to the body portion and a valve portion adapted to seat against and seal the valve seat of the body portion; a threaded portion on said plunger; and a burner tube having screw threads arranged to operatively engage the threaded portion of the control plunger, said burner tube being mounted in rotatable and sealed relationship with said body portion; and a manually operatable control device to rotate said burner tube.

3. In a hydrocarbon fuel burner, in combination, a fuel reservoir and a burner assembly, said burner assembly including a body portion, a burner tip extending above said body portion, the burner tip being provided with a fuel orifice and a fuel inlet communicating with the fuel reservoir and the interior of the body portion, a fuel shut-off valve reciprocable within said body portion, said valve having a stem, rotary means operably engaging said valve stem for reciprocating said valve, a cleaning needle structure positioned above said valve, said shut-off valve and cleaning needle structure being positioned in vertical alignment with said fuel inlet, and means interconnecting said valve stem and said cleaning needle, whereby upon actuation of said rotary means said shut-off valve and said cleaning needle move relative to said body portion simultaneously with each other and the shut-off valve opens and the cleaning needle concurrently and successively rises into operating engagement with the fuel orifice of the burner tip.

4. In a hydrocarbon fuel burner, in combination, a body portion adapted to be engaged with the fuel reservoir of the burner; said body portion including a bore and a shut-off valve movable axially of said bore, said valve having a stem extending above said valve; a burner tube, said burner tube extending above and being mounted in co-axial rotatable and sealed relationship with said body portion, a manually operatable control device positioned about the burner tube to rotate said burner tube and means responsive to the rotation of said burner tube to actuate said shut-off valve and move said valve axially of the bore, said means comprising an internally screw-threaded portion on said burner tube and an externally screw-threaded portion on said valve stem in operative engagement with said internally screw-threaded burner tube portion.

5. In a hydrocarbon fuel burner, in combination, a fuel reservoir and a burner assembly, said burner assembly including a body portion, a burner tube mounted in rotatable relationship with said body portion, an air tube extending downwardly from said body portion and communicating with the fuel reservoir, a fuel tube extending downwardly from said body portion and communicating with the fuel reservoir; a fuel mixing valve associated with said air and fuel tubes, and a fuel shut-off valve slidable within said body portion; said mixing valve and shut-off valve being mechanically interconnected with each other and means associated with said shut-off valve and mixing valve and responsive to the rotation of said burner tube, said shut-off valve and mixing valve being adapted to move simultaneously with each other and to concurrently and successively open the shut-off valve and the mixing valve upon rotation of said burner tube.

6. In a hydrocarbon fuel burner, in combination, a body portion adapted to be engaged with the fuel reservoir of the burner; said body portion including a bore; an air tube extending downwardly from said body in axial alignment with said bore, a fuel tube within said air tube, a mixing valve at the lower portion of the air tube, and means arranged for sliding movement with respect to the mixing valve and adapted to regulate the flow of fluid through the valve; a burner tube, said burner tube extending above and being mounted in co-axial rotatable and sealed relationship with said body portion, an operatable control device to rotate said burner tube, and means responsive to the rotation of said burner tube to actuate said mixing valve.

7. In a hydrocarbon fuel burner, in combination, a fuel reservoir and a burner assembly including a jet having a fuel orifice, said burner assembly including a body portion, an air tube extending downwardly from said body portion and communicating with the fuel reservoir, a fuel tube extending downwardly from said body portion and communicating with the fuel reservoir; a fuel mixing valve associated with said air and fuel tubes, and a jet cleaning needle structure including a needle, said needle being positioned above said fuel mixing valve and adapted to enter the fuel orifice of the jet, the cleaning needle structure and the valve being mechanically interconnected with each other, and means to move the cleaning needle structure and valve simultaneously with each other so as to open the mixing valve and raise the cleaning needle into operating engagement with the fuel orifice of the burner tip.

8. In a hydrocarbon fuel burner, in combination, a body portion adapted to be engaged with the fuel reservoir of the burner; a reciprocable valve and valve stem in said body portion; a rotatable burner tube extending above said body portion and a burner jet positioned at the upper portion of said tube, and a fuel orifice in said jet; a jet cleaning structure comprising a cleaning needle and arranged for sliding movement inside of and with respect to the burner tube and jet and an elongated supporting member connected at one end to said cleaning needle; said burner tube being mounted in rotatable sealed relationship with said body portion; an operatable control device to rotate said burner tube and means responsive to the rotation of said burner tube and operably engaging the other end of said elongated supporting member to impart longitudinal movement to said valve stem and the jet cleaning structure, to operate said valve and advance the needle into the fuel orifice of the jet.

9. In a hydrocarbon fuel burner, in combination, a burner body including a bore extending completely through said body, a fuel tube at the lower end of said body in co-axial alignment with the bore, and a burner tube extending upwardly from the upper end of said body in co-axial alignment with the bore, said bore, fuel tube, and burner tube comprising a fuel channel; shiftable control devices within the body and extending into the fuel tube and burner tube, said control devices comprising a fuel control means, a shut-off valve and a burner cleaning needle in co-axial alignment with each other and with the bore of the body; all of said structures being maintained in operating position and sealed against fuel leakage by a fluid seal comprising a gland and clamping nut threaded on the body portion in co-axial alignment with the bore; the arrangement being such that said clamping nut provides the sole retaining means for the burner tube and control devices, so that removal of said clamping nut permits disassembly of the burner and unobstructed straight-line access to the entire length of the fuel channel and access to the aforementioned control devices.

10. In a hydrocarbon fuel burner, in combination, a burner body including a bore extending completely through said body, a fuel tube at the lower end of said body in co-axial alignment with the bore, and a burner tube extending upwardly from the upper end of said body in co-axial alignment with the bore, said bore, fuel tube, and burner tube comprising a fuel channel; shiftable control devices within the body; said burner body and burner tube being sealed against fuel leakage by a fluid seal comprising a gland positioned between the body portion and the burner tube, and a clamping nut threaded on the outside of the upper portion of said body portion in co-axial alignment with the bore; whereby the removal of said clamping nut from the body portion permits disassembly of the burner and unobstructed straight-line access to the entire length of the fuel channel, and access to the aforementioned control devices.

11. In a hydrocarbon fuel burner, in combination, a burner body including a bore extending completely through said body, a fuel tube at the lower end of said body in co-axial alignment with the bore, said fuel tube and bore comprising a fuel channel, a mixing valve associated with said fuel tube and a shut-off valve seat within the body; and slidable control devices within the body, said control devices comprising a slidable fuel control structure extending to said mixing valve and a slidable shut-off valve in co-axial alignment with each other and with the bore of the body; all of said structures being maintained in operating position and sealed against fuel leakage by a fluid seal comprising a gland and clamping nut threaded on the body portion in co-axial alignment with the bore; whereby the removal of said clamping nut from the body portion permits unobstructed straight-line access to the entire length of the fuel channel, and access to the aforementioned control devices.

12. In a hydrocarbon fuel burner, in combination, burner body including a bore extending completely through said body, said bore comprising a fuel channel; a shut-off valve seat located within the lower portion of the body, and a slidable shut-off valve plunger, the lower portion of said plunger being located above the valve seat and adapted to be received by said seat when said valve is lowered, said plunger being in co-axial vertical alignment with the valve seat and with the bore of the body; all of said structures being in vertical alignment, said structure being maintained in operating position and sealed against fuel leakage by a fluid seal comprising a gland and clamping nut threaded on the upper portion of the body portion in co-axial vertical alignment with the bore and above said valve and valve seat, whereby the removal of said clamping nut from the body portion permits unobstructed straight-line access to the entire length of the fuel channel.

13. In a hydrocarbon fuel burner, in combination, a fuel reservoir, a burner body portion of generally circular shape including a bore in concentric relationship with the circular exterior portions of the body, said body portion having a vertical axis and being positioned above the fuel reservoir; a shut-off valve seat and a cooperating shut-off valve plunger housed within the bore of the body portion, said shut-off valve plunger comprising an externally threaded portion at one end thereof and a splined portion at the other end thereof arranged for sliding non-rotary movement with respect to the body portion; a threaded sleeve rotatably mounted on said body portion and having its threads in engagement with the threaded portion of the shut-off valve plunger whereby rotary movement of the sleeve will result in axial movement of the plunger to open or close the valve; the entire structure being characterized by the co-axial arrangement of all of the aforementioned parts in straight-line relationship with each other, so that the burner assembly will be of compact mechanical design having no external projections.

14. In a hydrocarbon fuel burner, in combination, a fuel reservoir, a burner body portion of generally circular shape including a bore in concentric relationship with the circular exterior portions of the body, a burner jet positioned above said bore the jet being provided with an orifice, said body portion having a vertical axis and being positioned above the fuel reservoir; an air tube extending downwardly from said body portion into the fuel reservoir, a fuel tube extending downwardly from said body portion into the fuel reservoir, and a fuel mixing valve structure associated with said air and fuel tubes; a shut-off valve seat and a cooperating shut-off valve plunger housed within the bore of the body portion and interconnected with the aforementioned fuel tube, said shut-off valve plunger comprising a threaded portion and a splined portion arranged for sliding non-rotary movement with respect to the body portion; a cleaning needle positioned above and connected to the shut-off valve plunger, said needle being associated with said jet orifice, said mixing valve structure, cleaning needle and shut-off valve plunger being mechanically interconnected, and actuating mechanisms for opening and closing the mixing valve, opening and closing the shut-off valve, and raising and lowering the cleaning needle; said actuating mechanisms including a threaded sleeve having its threads in engagement with the threaded portion of the shut-off valve plunger whereby rotary movement of the sleeve will result in axial movement of the plunger to open or close the mixing valve and shut-off valve and to raise or lower the cleaning needle; the entire structure being characterized by the co-axial arrangement of all of the aforementioned parts in straight-line relationship with each other, so that the burner assembly will be of compact mechanical design having no external projections.

15. In a hydrocarbon fuel burner, in combination, a body portion adapted to be connected with the fuel reservoir of the burner, a burner jet associated with said body portion, the body portion including a bore and a control device for said jet movable axially of said bore, a valve in said bore, a burner tube, said burner tube being mounted in rotatable relationship with said body portion, an auxiliary fuel reservoir operatively connected to said burner tube and adapted to rotate said burner tube, and means responsive to the rotation of said burner tube to actuate said control device, said means comprising internal screw threads on said burner tube and a plunger carrying said valve, said plunger having external screw threads engaged by the internal screw threads of said burner tube.

16. In a hydrocarbon fuel burner, in combination, a body portion adapted to be connected with the fuel reservoir of the burner, said body portion including a bore and a shut-off valve movable axially of said bore, a burner tube, said burner tube being mounted in rotatable relationship with said body portion, a control device operatively connected to said burner tube and adapted to rotate said burner tube, said control device being provided with an auxiliary fuel reservoir and means responsive to the rotation of said burner tube to actuate said shut-off valve, said means comprising internal screw threads on said burner tube and a plunger carrying said valve, said plunger having external screw threads engaged by the internal screw threads of said burner tube.

17. In a hydrocarbon fuel burner, in combination, a fuel reservoir and a burner assembly, said burner assembly including a body portion, a burner tip extending upwardly from the body portion, said burner tip being provided with a fuel orifice, a fuel inlet communicating with the fuel reservoir and the interior of the body portion, a fuel shut-off valve, said valve having a stem, rotary means operably engaging said valve stem for reciprocating said valve, a seat for said valve in said fuel inlet, and a cleaning needle structure, said cleaning needle structure being positioned between said shut-off valve and the fuel orifice, said shut-off valve being movable relative to said fuel inlet and intermediate the burner tip and said seat for said valve, and means interconnecting said valve stem and cleaning needle to move said shut-off valve and said cleaning needle simultaneously with each other, whereby after substantially complete opening of the shut-off valve, the cleaning needle is inserted into the fuel orifice of the burner tip.

BESTOR ROBINSON.

REFERENCES CITED

The following references are of record in the file of this patent:

UNITED STATES PATENTS

| Number | Name | Date |
| --- | --- | --- |
| 496,450 | Shedlock | May 2, 1893 |
| 694,173 | Newbold | Feb. 25, 1902 |
| 728,710 | Hayes | May 19, 1903 |
| 901,606 | Fickert | Oct. 20, 1908 |
| 1,078,578 | Gehring et al. | Nov. 11, 1913 |
| 1,271,923 | Merle | July 9, 1918 |
| 1,310,938 | Ballerstedt | July 22, 1919 |
| 1,466,403 | Knapp | Aug. 28, 1923 |
| 1,586,489 | Trow | May 25, 1926 |
| 1,893,598 | Rasmussen | Jan. 10, 1933 |
| 1,915,141 | Wiley et al. | June 20, 1933 |
| 1,935,410 | Olsen | Nov. 14, 1933 |
| 2,121,268 | Shaffer | June 21, 1938 |
| 2,129,100 | Pickup | Sept. 6, 1938 |
| 2,139,819 | Graetz | Dec. 13, 1938 |

FOREIGN PATENTS

| Number | Country | Date |
| --- | --- | --- |
| 395,623 | France | Jan. 4, 1909 |